United States Patent
Krishnaswamy

(10) Patent No.: US 12,046,147 B2
(45) Date of Patent: Jul. 23, 2024

(54) SYSTEM AND METHOD FOR ANALYSING AN AUDIO TO MEASURE ORAL READING FLUENCY

(71) Applicant: Lumos Information Services LLC, Piscataway, NJ (US)

(72) Inventor: Mukunda Krishnaswamy, Princeton, NJ (US)

(73) Assignee: Lumos Information Services LLC, Piscataway, NJ (US)

( * ) Notice: Subject to any disclaimer, the term of this patent is extended or adjusted under 35 U.S.C. 154(b) by 689 days.

(21) Appl. No.: 17/237,016

(22) Filed: Apr. 21, 2021

(65) Prior Publication Data
US 2022/0343790 A1     Oct. 27, 2022

(51) Int. Cl.
| | |
|---|---|
| G09B 19/04 | (2006.01) |
| G06F 40/242 | (2020.01) |
| G06F 40/284 | (2020.01) |
| G09B 17/00 | (2006.01) |
| G10L 15/02 | (2006.01) |
| G10L 15/22 | (2006.01) |
| G10L 15/26 | (2006.01) |
| G10L 25/51 | (2013.01) |
| G10L 25/90 | (2013.01) |

(52) U.S. Cl.
CPC ......... *G09B 17/003* (2013.01); *G06F 40/242* (2020.01); *G06F 40/284* (2020.01); *G09B 19/04* (2013.01); *G10L 15/02* (2013.01); *G10L 15/22* (2013.01); *G10L 15/26* (2013.01); *G10L 25/51* (2013.01); *G10L 25/90* (2013.01); *G10L 2015/025* (2013.01)

(58) Field of Classification Search
CPC ......... G09B 19/04; G10L 15/02; G10L 15/26; G10L 25/51; G10L 25/90; G06F 40/242; G06F 40/284
See application file for complete search history.

(56) References Cited

U.S. PATENT DOCUMENTS

| | | | | |
|---|---|---|---|---|
| 7,455,522 | B2 * | 11/2008 | Polanyi | G09B 7/02 434/178 |
| 8,457,967 | B2 * | 6/2013 | Audhkhasi | G09B 19/04 704/235 |
| 8,494,857 | B2 * | 7/2013 | Pakhomov | G10L 17/26 704/271 |
| 9,576,593 | B2 * | 2/2017 | Pakhomov | G10L 15/02 |

(Continued)

*Primary Examiner* — Omkar A Deodhar

(57) ABSTRACT

A system (1) for analyzing an audio to measure oral reading fluency or progress in oral reading fluency (2) in a text illustrated through the audio. The system (1) includes an input unit (3) which receives a target audio (4) from a user. The target audio (4) relates to an oral reading of the text by the user. The system (1) further includes a transcribing unit (5) which receives and processes the target audio (4) and generates a target transcription (6) of the target audio (4). The system (1) also includes a processing unit (7) which receives and processes at least one of the target transcription (6), the text (8), the target audio (4), or a reference audio (9), or combination thereof, and generates a primary metrics (10) having various parameters measuring reading fluencies. The system supports user specific dictionary customization to incorporate non-dictionary words in the analysis.

16 Claims, 12 Drawing Sheets

(56) References Cited

U.S. PATENT DOCUMENTS

| | | | |
|---|---|---|---|
| 2004/0067472 A1* | 4/2004 | Polanyi | G09B 5/02 |
| | | | 434/178 |
| 2011/0076654 A1* | 3/2011 | Green | G09B 7/04 |
| | | | 434/169 |
| 2018/0315420 A1* | 11/2018 | Ash | G10L 15/193 |
| 2020/0320898 A1* | 10/2020 | Johnson | G10L 15/08 |
| 2021/0335147 A1* | 10/2021 | Johnson | G10L 15/26 |

* cited by examiner

33

Words Deleted

| Cold Reading |

Original Text    Words Deleted = 22

ONCE UPON A TIME THERE WAS A LITTLE RED BOAT THAT LIVED ON A RIVER NEAR THE COAST OF MAINE THE LITTLE RED BOAT WAS HAPPY SHE BELONGED TO A VERY NICE FAMILY WHO KEPT HER TIED TO THEIR DOCK FROM THE DOCK SHE COULD WATCH EVERYTHING THAT WAS HAPPENING ON THE RIVER THERE WERE LOBSTER BOATS WITH LOBSTERMEN HAULING THEIR LOBSTER TRAPS FULL OF PEOPLE GOING FOR A BOAT RIDE AND SAILBOATS BEING PUSHED BY THE WIND SOMETIMES THE FAMILY THAT OWNED THE LITTLE RED BOAT CLIMBED INTO HER AND ROWED OUT TO THEIR SAILBOAT THEY TIED HER BEHIND THE SAILBOAT AND AS THEY SAILED THE LITTLE RED BOAT FOLLOWED THE LITTLE RED BOAT LIKED TO GO SAILING BECAUSE SHE COULD SEE OTHER PARTS OF THE RIVER FAR FROM HER DOCK THE SAILBOAT AND THE LITTLE RED BOAT WERE GOOD FRIENDS

| Hot Reading |

Original Text    Words Deleted = 2

ONCE UPON A TIME THERE WAS A LITTLE RED BOAT THAT LIVED ON A RIVER NEAR THE COAST OF MAINE THE LITTLE RED BOAT WAS HAPPY SHE BELONGED TO A VERY NICE FAMILY WHO KEPT HER TIED TO THEIR DOCK FROM THE DOCK SHE COULD WATCH EVERYTHING THAT WAS HAPPENING ON THE RIVER THERE WERE LOBSTER BOATS WITH LOBSTERMEN HAULING THEIR LOBSTER TRAPS FULL OF PEOPLE GOING FOR A BOAT RIDE AND SAILBOATS BEING PUSHED BY THE WIND SOMETIMES THE FAMILY THAT OWNED THE LITTLE RED BOAT CLIMBED INTO HER AND ROWED OUT TO THEIR SAILBOAT THEY TIED HER BEHIND THE SAILBOAT AND AS THEY SAILED THE LITTLE RED BOAT FOLLOWED THE LITTLE RED BOAT LIKED TO GO SAILING BECAUSE SHE COULD SEE OTHER PARTS OF THE RIVER FAR FROM HER DOCK THE SAILBOAT AND THE LITTLE RED BOAT WERE GOOD FRIENDS

Words Inserted

| Cold Reading |
|---|

Student Transcript      Words Inserted = 3

ONCE UPON A TIME THERE WAS A LITTLE BIT BORED THAT LIVED ON A RIVER NEAR THE COAST OFF MAN THE LITERATE BUT WAS HAPPY SHE BELONGED TO HER VERY NICE FAMILY WHO KEP HER TYPE OF THE DOG FROM THE DOG SHE COULD WATCH EVERYTHING THAT WAS HAPPENING ON THE RIVER THERE WERE LOBSTER BOATS WITH LOBSTERMAN HOLDING THEIR LOBSTER TRAPS MOTOR BOAT FULL OF PEOPLE GOING FOR ABORTED AND SAILBOAT BEING OPPOSED BY THE WINDOW SOMETIMES THE FAMILY THAT WON THE LITERAL BOARD CAME TOE AND GOT OFF THEIR SAILBOAT IF IT HAD BEHIND IT STILL WOULD END AS THIS STILL REGULATE BOTH FOLLOWED IN A BOOK DR BRAZILIAN BECAUSE SHE COULD SEE OTHER [PART] OF FAR FROM THE [PARENTAL] [DIFFERENCE]

Original Text

ONCE UPON A TIME THERE WAS A LITTLE RED BOAT THAT LIVED ON A RIVER NEAR THE COAST OF MAINE THE LITTLE RED BOAT WAS HAPPY SHE BELONGED TO A VERY NICE FAMILY WHO KEPT HER TIED TO THEIR DOCK FROM THE DOCK SHE COULD WATCH EVERYTHING THAT WAS HAPPENING ON THE RIVER THERE WERE LOBSTER BOATS WITH LOBSTERMEN HAULING THEIR LOBSTER TRAPS FULL OF PEOPLE GOING FOR A BOAT RIDE AND SAILBOATS BEING PUSHED BY THE WIND SOMETIMES THE FAMILY THAT OWNED THE LITTLE RED BOAT CLIMBED INTO HER AND ROWED OUT TO THEIR SAILBOAT THEY TIED HER BEHIND THE SAILBOAT AND AS THEY SAILED THE LITTLE RED BOAT FOLLOWED THE LITTLE RED BOAT LIKED TO GO SAILING BECAUSE SHE COULD SEE OTHER PARTS OF THE RIVER FAR FROM HER DOCK THE SAILBOAT AND THE LITTLE RED BOAT WERE GOOD FRIENDS

| Hot Reading |
|---|

Student Transcript      Words Inserted = 5

ONCE UPON A TIME THERE WAS A LITTLE RED BORED THAT LIVED ON A REVERSE LOOKING AT THE POST OFF MEANT THAT LITTLE BIT BOAT WAS HAPPY SHE BELONGED TO A VERY NICE FAMILY WHO DEPT HER TIED PUT THEIR DOG FROM THE DOG SHE COULD WATCH EVERYTHING THAT WAS HAPPENING ON THE RIVER THERE WERE LOBSTER BOATS WITH OSTERMAN HAULING THEIR LOBSTER TRAPS MOTOR BOATS FULL OF PEOPLE GOING FOR A BOAT RIGHT ON SAILBOAT BEING WAS WAY THE WIND SOMETIMES THE FAMILY THAT OWNED THE LITTLE IT BOTH TIME INTO HER AND DRAW IT OUT TO THEIR SAILBOAT THEY TIED HER BEHIND TO SAVOR IT AND AS THIS IS THE LITTLE IT VOTE FOLLOWED PARTICULAR IT BOAT LIKE TO GO SAILING BECAUSE SHE COULD HEAR THE PART OF THE RIVER ARE FROM THE DOCTOR THE [SILVER] AND THE LITTLE [BIT] [BORED] [OR] [BOTH]

Original Text

ONCE UPON A TIME THERE WAS A LITTLE RED BOAT THAT LIVED ON A RIVER NEAR THE COAST OF MAINE THE LITTLE RED BOAT WAS HAPPY SHE BELONGED TO A VERY NICE FAMILY WHO KEPT HER TIED TO THEIR DOCK FROM THE DOCK SHE COULD WATCH EVERYTHING THAT WAS HAPPENING ON THE RIVER THERE WERE LOBSTER BOATS WITH LOBSTERMEN HAULING THEIR LOBSTER TRAPS FULL OF PEOPLE GOING FOR A BOAT RIDE AND SAILBOATS BEING PUSHED BY THE WIND SOMETIMES THE FAMILY THAT OWNED THE LITTLE RED BOAT CLIMBED INTO HER AND ROWED OUT TO THEIR SAILBOAT THEY TIED HER BEHIND THE SAILBOAT AND AS THEY SAILED THE LITTLE RED BOAT FOLLOWED THE LITTLE RED BOAT LIKED TO GO SAILING BECAUSE SHE COULD SEE OTHER PARTS OF THE RIVER FAR FROM HER DOCK THE SAILBOAT AND THE LITTLE RED BOAT WERE GOOD FRIENDS

Words Substituted

| Cold Reading |
|---|

Student Transcript          Words Substituted = 43          6

ONCE UPON A TIME THERE WAS A LITTLE [BIT] [BORED] THAT LIVED ON [A RIVER] NEAR THE COAST [OFF] [MAN] THE [LITERATE] [BUT] WAS HAPPY SHE BELONGED TO [HER] VERY NICE FAMILY WHO KEP HER [TYPE] [OF] [THE] [DOG] FROM THE [DOG] SHE COULD WATCH EVERYTHING THAT WAS HAPPENING ON THE RIVER THERE WERE LOBSTER BOATS WITH [LOBSTERMAN] [HOLDING] THEIR LOBSTER TRAPS MOTOR BOAT FULL OF PEOPLE GOING FOR [ABORTED] AND [SAILBOAT] BEING [OPPOSED] BY THE [WINDOW] SOMETIMES THE FAMILY THAT [WON] THE [LITERAL] [BOARD] [CAME] [TOE] AND [GOT] [OFF] THEIR SAILBOAT [IF] [IT] [HAD] BEHIND [IT] [STILL] [WOULD] END AS [THIS] [STILL] [REGULATE] [BOTH] FOLLOWED [IN] [A] [BOOK] [OR] [BRAZILIAN] BECAUSE SHE COULD SEE OTHER [PART] OF FAR FROM THE [PARENTAL] [DIFFERENCE]

Original Text          8

ONCE UPON A TIME THERE WAS A LITTLE RED BOAT THAT LIVED ON A RIVER NEAR THE COAST OF MAINE THE LITTLE RED BOAT WAS HAPPY SHE BELONGED TO A VERY NICE FAMILY WHO KEPT HER TIED TO THEIR DOCK FROM THE DOCK SHE COULD WATCH EVERYTHING THAT WAS HAPPENING ON THE RIVER THERE WERE LOBSTER BOATS WITH LOBSTERMEN HAULING THEIR LOBSTER TRAPS FULL OF PEOPLE GOING FOR A BOAT RIDE AND SAILBOATS BEING PUSHED BY THE WIND SOMETIMES THE FAMILY THAT OWNED THE LITTLE RED BOAT CLIMBED INTO HER AND ROWED OUT TO THEIR SAILBOAT THEY TIED HER BEHIND THE SAILBOAT AND AS THEY SAILED THE LITTLE RED BOAT FOLLOWED THE LITTLE RED BOAT LIKED TO GO SAILING BECAUSE SHE COULD SEE OTHER PARTS OF THE RIVER FAR FROM HER DOCK THE SAILBOAT AND THE LITTLE RED BOAT WERE GOOD FRIENDS

| Hot Reading |
|---|

Student Transcript          Words Substituted = 42          6

ONCE UPON A TIME THERE WAS A LITTLE [BIT] [BORED] THAT LIVED ON A [REVERSE] [LOOKING] AT THE [POST] [OFF] [MEANT] [THAT] LITTLE [BIT] BOAT WAS HAPPY SHE BELONGED TO A VERY NICE FAMILY WHO DEPT HER TIED [PUT] THEIR [DOG] FROM THE [DOG] SHE COULD WATCH EVERYTHING THAT WAS HAPPENING ON THE RIVER THERE WERE LOBSTER BOATS WITH [OSTERMAN] HAULING THEIR LOBSTER TRAPS MOTOR BOATS FULL OF PEOPLE GOING FOR A BOAT [RIGHT] [ON] [SAILBOAT] BEING [WAS] [WAY] THE WIND SOMETIMES THE FAMILY THAT OWNED THE LITTLE [IT] [BOTH] [TIME] INTO HER AND [DRAW] IT OUT TO THEIR SAILBOAT THEY TIED HER BEHIND [TO] [SAVOR] IT AND AS [THIS] [IS] THE LITTLE [IT] [VOTE] FOLLOWED [PARTICULAR] [IT] BOAT [LIKE] TO GO SAILING BECAUSE SHE COULD [HEAR] [THE] [PART] OF THE RIVER [ARE] FROM [THE] [DOCTOR] THE [SILVER] AND THE LITTLE [BIT] [BORED] [OR] [BOTH]

Original Text          8

ONCE UPON A TIME THERE WAS A LITTLE RED BOAT THAT LIVED ON A RIVER NEAR THE COAST OF MAINE THE LITTLE RED BOAT WAS HAPPY SHE BELONGED TO A VERY NICE FAMILY WHO KEPT HER TIED TO THEIR DOCK FROM THE DOCK SHE COULD WATCH EVERYTHING THAT WAS HAPPENING ON THE RIVER THERE WERE LOBSTER BOATS WITH LOBSTERMEN HAULING THEIR LOBSTER TRAPS FULL OF PEOPLE GOING FOR A BOAT RIDE AND SAILBOATS BEING PUSHED BY THE WIND SOMETIMES THE FAMILY THAT OWNED THE LITTLE RED BOAT CLIMBED INTO HER AND ROWED OUT TO THEIR SAILBOAT THEY TIED HER BEHIND THE SAILBOAT AND AS THEY SAILED THE LITTLE RED BOAT FOLLOWED THE LITTLE RED BOAT LIKED TO GO SAILING BECAUSE SHE COULD SEE OTHER PARTS OF THE RIVER FAR FROM HER DOCK THE SAILBOAT AND THE LITTLE RED BOAT WERE GOOD FRIENDS

FIG. 7

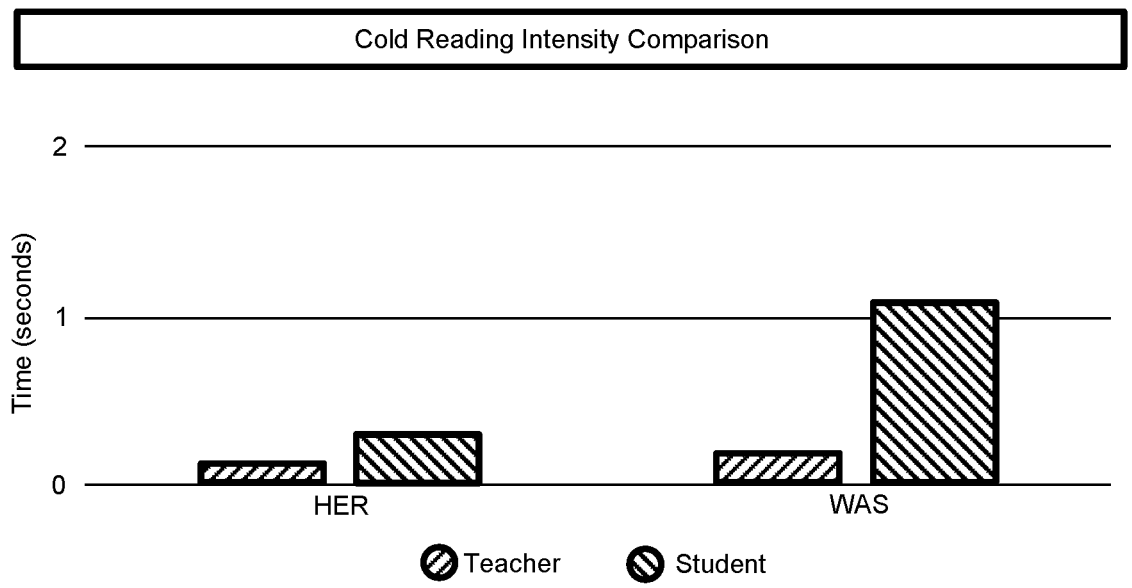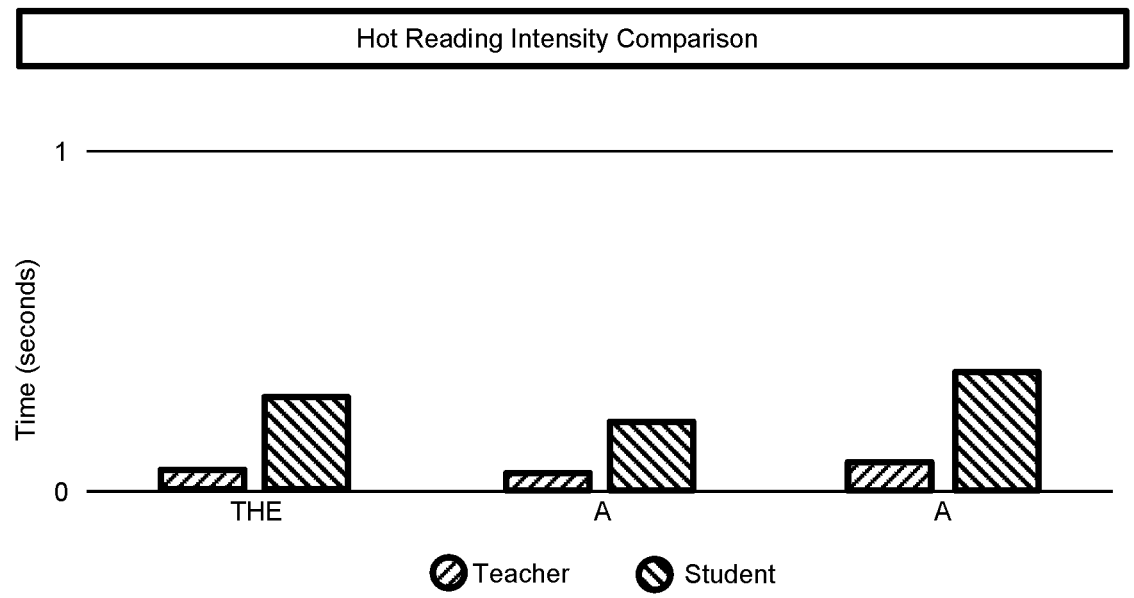
FIG. 10

35

Words Repeated 8

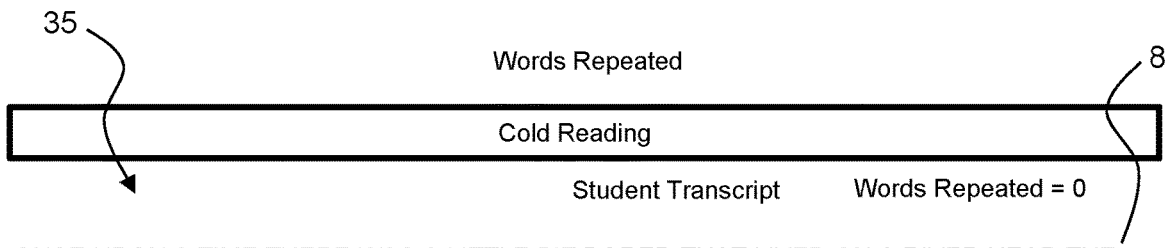

Student Transcript    Words Repeated = 0

ONCE UPON A TIME THERE WAS A LITTLE BIT BORED THAT LIVED ON A RIVER NEAR THE COAST OFF MAN THE LITERATE BUT WAS HAPPY SHE BELONGED TO HER VERY NICE FAMILY WHO KEP HER TYPE OF THE DOG FROM THE DOG SHE COULD WATCH EVERYTHING THAT WAS HAPPENING ON THE RIVER THERE WERE LOBSTER BOATS WITH LOBSTERMAN HOLDING THEIR LOBSTER TRAPS MOTOR BOAT FULL OF PEOPLE GOING FOR ABORTED AND SAILBOAT BEING OPPOSED BY THE WINDOW SOMETIMES THE FAMILY THAT WON THE LITERAL BOARD CAME TOE AND GOT OFF THEIR SAILBOAT IF IT HAD BEHIND IT STILL WOULD END AS THIS STILL REGULATE BOTH FOLLOWED IN A BOOK DR BRAZILIAN BECAUSE SHE COULD SEE OTHER PART OF FAR FROM THE PARENTAL DIFFERENCE

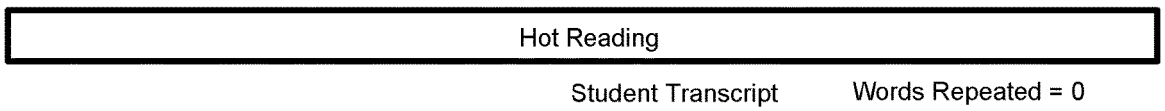

Student Transcript    Words Repeated = 0

ONCE UPON A TIME THERE WAS A LITTLE RED BORED THAT LIVED ON A REVERSE LOOKING AT THE POST OFF MEANT THAT LITTLE BIT BOAT WAS HAPPY SHE BELONGED TO A VERY NICE FAMILY WHO DEPT HER TIED PUT THEIR DOG FROM THE DOG SHE COULD WATCH EVERYTHING THAT WAS HAPPENING ON THE RIVER THERE WERE LOBSTER BOATS WITH OSTERMAN HAULING THEIR LOBSTER TRAPS MOTOR BOATS FULL OF PEOPLE GOING FOR A BOAT RIGHT ON SAILBOAT BEING WAS WAY THE WIND SOMETIMES THE FAMILY THAT OWNED THE LITTLE IT BOTH TIME INTO HER AND DRAW IT OUT TO THEIR SAILBOAT THEY TIED HER BEHIND TO SAVOR IT AND AS THIS IS THE LITTLE IT VOTE FOLLOWED PARTICULAR IT BOAT LIKE TO GO SAILING BECAUSE SHE COULD HEAR THE PART OF THE RIVER ARE FROM THE DOCTOR THE SILVER AND THE LITTLE BIT BORED OR BOTH

SYSTEM AND METHOD FOR ANALYSING AN AUDIO TO MEASURE ORAL READING FLUENCY

FIELD OF INVENTION

The present invention relates to measuring the oral reading fluency of a person in a specific language. More specifically, the invention relates to measuring oral reading fluency or progress in oral reading fluency of a person in a specific language for reading out a specific text.

BACKGROUND OF INVENTION

Reading skills are a critical component of reading fluency. Students who have developed reading fluency, can read selected passages quickly with few or no errors and can express their thoughts and emotions while reading.
Conventional methods do not prove to be very effective in achieving the desired fluency level since there is a lack of personal and personalized learning of the student. Also, the requisite amount of practice is absent too in the conventional methods. Repetitions are monotonous and the student lacks interest and fails to express his or her emotions through proper voice modulation and annotation. These conventional methods also ensue significant delays in sharing feedback with students since they need to be done manually. The conventional methods do not take a holistic approach of making the student understand the context while reading and thus make reading exercise pretty boring. Research has shown that reading fluency can be improved with continuous practice and by providing useful metrics by comparing the current level of the student's reading fluency with that of an expert. The conventional methods also lack in such continuous comparison of the student's reading fluency with that of an expert.

In one prior art patent U.S. Pat. No. 7,455,522B2 titled "Systems and methods for dynamic reading fluency instruction and improvement", techniques for dynamic personalized reading fluency instruction and improvement are disclosed, where a user reading fluency level are determined based on one or more spoken responses provided by the user during one or more reading aloud session of a text that has been evaluated for discourse structure and information structure of sentences. One or more reading fluency improvement aids are provided to the user based on one or more of: determined user-specific reading fluency deficiencies, user-personalized information responses and user class-specific reading fluency deficiencies as determined by the reading fluency improvement system. Even though, the art mentions about comparing some speech parameters of the user and an expert, however, the art misses out to completely cover comparison of all relevant parameters' measurements and comparison.

Another prior art patent JP4470417B2, titled "Recording medium storing dynamic evaluation method, system and program for reading fluency and proficiency" discloses system and method to evaluate the reading fluency and skillfulness of a user by presenting a text, having been evaluated as to the discourse structure and information structure of a sentence, to the user. While the user reads the evaluated text aloud once or more, a reading fluency level is determined based upon one or more responses that the user speaks.

Another prior art exists CN109545244A, titled "Speech evaluating method, device, electronic equipment and storage medium" discloses a speech evaluation method and device, electronic equipment and a storage medium. The speech evaluation method comprises the steps that to-be-evaluated speech corresponding to a preset reference text collected by intelligent equipment is acquired; according to each standard phoneme corresponding to the preset reference text, the evaluation score of an audio frame corresponding to the standard phoneme in the to-be-evaluated speech is determined; according to the evaluation score of the audio frame, a to-be-corrected audio frame in the to-be-evaluated speech is determined; according to a letter pronunciation mapping table, in the preset reference text, a target letter corresponding to the standard phoneme corresponding to the to-be-corrected audio frame is determined, and the intelligent equipment is controlled to output the target letter, wherein the letter pronunciation mapping table comprises a corresponding relation between the phoneme and the letter. According to the technical scheme, a user can know which letters correspond to wrong or nonstandard pronunciation in the preset reference text in the following reading process so that the pronunciation can be corrected in a targeted mode, and the user can be helped to more quickly and efficiently improve the spoken language level.

Yet another prior art exists U.S. Pat. No. 9,576,593B2, titled "Speech processing system and method" discloses techniques for calculating one or more verbal fluency scores for a person. An example method includes classifying, by a computing device, samples of audio data of speech of a person, based on amplitudes of the samples, into a first class of samples including speech or sound and a second class of samples including silence. The method further includes analyzing the first class of samples to determine a number of words spoken by the person, and calculating a verbal fluency score for the person based at least in part on the determined number of words spoken by the person.

Another prior art US20180315420A1, titled "Speech processing system and method" discloses a speech processing system which includes an input for receiving an input utterance spoken by a user and a word alignment unit configured to align different sequences of acoustic speech models with the input utterance spoken by the user. Each different sequence of acoustic speech models corresponds to a different possible utterance that a user might make. The system identifies any parts of a read prompt text that the user skipped; any parts of the read prompt text that the user repeated; and any speech sounds that the user inserted between words of the read prompt text. The information from the word alignment unit can be used to assess the proficiency and/or fluency of the user's speech.

Another prior art U.S. Pat. No. 8,457,967B2, titled "Automatic evaluation of spoken fluency" discloses a procedure to automatically evaluate the spoken fluency of a speaker by prompting the speaker to talk on a given topic, recording the speaker's speech to get a recorded sample of speech, and then analyzing the patterns of disfluencies in the speech to compute a numerical score to quantify the spoken fluency skills of the speakers. The numerical fluency score accounts for various prosodic and lexical features, including formant-based filled-pause detection, closely-occurring exact and inexact repeat N-grams, normalized average distance between consecutive occurrences of N-grams. The lexical features and prosodic features are combined to classify the speaker with a C-class classification and develop a rating for the speaker.

Yet another prior art U.S. Pat. No. 8,494,857B2, titled "Automatic measurement of speech fluency" discloses techniques for automatically measuring fluency of a patient's speech based on prosodic characteristics thereof. The prosodic characteristics may include statistics regarding silent pauses, filled pauses, repetitions, or fundamental frequency of the patient's speech. The statistics may include a count, average number of occurrences, duration, average duration, frequency of occurrence, standard deviation, or other statistics. In one embodiment, a method includes receiving an audio sample that includes speech of a patient, analyzing the audio sample to identify prosodic characteristics of the speech of the patient, and automatically measuring fluency of the speech of the patient based on the prosodic characteristics. These techniques may present several advantages, such as objectively measuring fluency of a patient's speech without requiring a manual transcription or other manual intervention in the analysis process.

Some of the arts do mention about comparing some of the parameters of an expert reader and a user, however, such comparison is not holistic, and does not give complete metrics and overview of oral reading fluency of a user. While other arts just focus on analysis of user's audio alone which definitely shall not give a clear picture of oral reading fluency as such measurements are stand-alone without any expert comparison.

Therefore, a mechanism is required which can provide a holistic and clear measurement of a user's oral reading fluency for a particular language concerning a specific text to overcome the problems in the above-mentioned existing techniques in the prior art.

OBJECTIVE OF INVENTION

The objective of the invention is to provide a mechanism for measuring oral reading fluency or progress in oral reading fluency which can provide a holistic and clear measurement of a user's oral reading fluency for a particular language concerning a specific text.

SUMMARY OF INVENTION

The objective of the invention is achieved by a system for analyzing an audio to measure oral reading fluency or progress in oral reading fluency in a text illustrated through the audio according to claim 1.

The system includes an input unit, a transcribing unit, and a processing unit. The input unit receives a target audio from a user. The target audio relates to an oral reading of the text by the user. The transcribing unit receives and processes the target audio and generates a target transcription of the target audio. The processing unit receives and processes at least one of the target transcription, the text, the target audio, or a reference audio, or combination thereof. The reference audio relates to an oral reading of the text by a reference person. Based on processing, the processing unit generates primary metrics. The primary metrics include at least one or combinations of the following:

a count of total number of words in the text,
a count of number of words in the target transcription,
a count of correct number of words correctly read by the user from the text,
a words per minute count relating to number of words orally read out by the user every minute,
a correct word per minute count relating number of correct words orally read out by the user every minute,
an insertion information related to additional words added by the user to the text in the target transcription,
a deletion information related to words omitted by the user to the text in the target transcription,
a substitution information related to words replaced by different words to the text in the target transcription,
a prolonging or rapid speech information relates to additional or less time taken by the user to read a word in comparison to the time taken to read the same word by the reference person,
an interjection information relates to words in the target transcription which are not part of a dictionary,
a repetition information relates to words that are same and are placed adjacent to each other in target transcription,
an intensity information relates to an intensity of at least each of the words or phonemes in the target audio, or combination thereof,
a pitch information relates to pitch of at least each of the words or phonemes in the target audio, or combination thereof,
a pause information relates to pauses taken by the user in the target audio, and
a phoneme information relates to phonemes in the target audio.

According to one embodiment of the system, wherein the processing unit receives and processes at least one of the insertion information, the deletion information, the substitution information, or combination thereof along with the target transcription and the text, and generates a fluency report showing various words omitted, substituted, or added, or combination thereof by the user while reading the text, wherein the words omitted, substituted, and added are annotated differently. This embodiment is beneficial as it provides a holistic view of fluency related to omission, substitution, and deletion in a single reporting pattern.

According to another embodiment of the system, wherein the processing unit receives and processes the time taken to read each word relative to a reference person, and generates a prolonging/tachylalia graph showing words which were prolonged/read fast and a time taken by the user to read the prolonged word with respect to a time taken by the reference person to read the word. This embodiment is beneficial, as it provides a visual representation of specific words which were prolonged or read rapidly.

According to yet another embodiment of the system, wherein the processing unit processes the target audio and the target transcription and generates a target words per minute count and a target time taken by the user to read out each of the word in target transcription. The processing unit further processes the reference audio and the text, and generates the reference word per minute count and a reference time taken by the reference person to read out each of the words in the text. Thereafter, the processing unit compares the target words per minute count and the reference words per minute count and determines a normalizing factor by dividing the reference words per minute count and the target words per minute count. Further, the processing unit normalizes the target time with the normalization factor by multiplying the target time with the normalization factor and generates a normalized target time for each word. In furtherance, the processing unit compares the normalized target time and the reference time for each of the corresponding information to deduce a prolonging ratio and to compare the prolonging ratio and a prolonging threshold, and if the absolute value of prolonging ratio is more than the prolonging threshold, generates the prolonging information for such specific words in the target transcription. In case if the user has taken more time for orally reading the word with respect to the reference person, it is referred to as prolonging, and if the user has taken lesser time for orally reading the word with respect to the reference person, it is referred as exceptionally rapid reading (tachylalia). This embodiment is beneficial, as it provides for accurate measurement and determination for both prolonging and tachylalia.

According to one embodiment of the system, wherein the processing unit receives and processes the interjection information and the target transcription, and generates an interjection fluency report with words determined to be the interjection onto the target transcription. This embodiment is beneficial, as it provides a visual representation of additional words that affect the oral reading fluency of the user.

According to another embodiment of the system, wherein the processing unit receives and processes the repetition information and the target transcription, and generates a repetition fluency report with words determined to be the repetitions onto the target transcription. This embodiment is beneficial, as it provides a visual representation of additional words which are repeated consecutively by the user.

According to yet another embodiment of the system, wherein the processing unit receives and processes the intensity information and generates a target intensity graph related to intensity of each word read by the user. The processing unit further divides the target intensity graph and a reference intensity graph into multiple frames on a time scale, and categorizes each of the frames to either have local maxima (rising) or local minima (falling) with respect to a previous frame in each of the intensity graphs. The processing unit further compares each of the categorized frames in the target intensity graph with corresponding categorized frames in the reference intensity graph, and based on the comparison, determines an intensity proximity score of the intensities of each of the corresponding words read by the user and the reference person. A lower proximity score is indicative of a difference in the reading style for that specific word. The reference intensity graph relates to the intensity of each word read by the reference person. This embodiment is beneficial since it provides a quantitative comparison of expression and fluency between two readers at both word and phoneme level based on the intensity data.

According to one embodiment of the system, wherein the processing unit receives and processes the pitch information and generates a target pitch graph related to pitch of each word read by the user. The processing unit further divides the target pitch graph and a reference pitch graph into multiple frames on a time scale and categorizes each of the frames to either have local maxima (rising) or local minima (falling) with respect to a previous frame in each of the pitch graphs. The processing unit further compares each of the categorized frames in the target pitch graph with corresponding categorized frames in the reference pitch graph, and based on the comparison, determines a pitch proximity score of the pitches of each of the corresponding words read by the user and the reference person. A lower proximity score is indicative of significant differences in the reading styles between the two readers. The reference pitch graph relates to the pitch of each word read by the reference person. This embodiment is beneficial since it provides a quantitative comparison of expression and fluency between two readers at both word and phoneme level based on the pitch data.

The object of the invention is also achieved by a method for analyzing an audio to measure fluency or progress in fluency in a text illustrated through the audio according to claim 20. The method includes steps of receiving a target audio from a user using an input unit, further sending the target audio to the transcribing unit, and processing the target audio by the transcribing unit to generate a target transcription of the target audio, and receiving and processing at least one of the target transcription, the text, the target audio, or a reference audio, or combination thereof by a processing unit. The target audio relates to oral reading of the text by the user, and the reference audio relates to oral reading of the text by a reference person. Based on such processing, the method includes steps for generating primary metrics by the processing unit. The primary metrics includes at least one of:

a count of total number of words in the text,
a count of number of words in the target transcription,
a count of correct number of words correctly read by the user from the text,
a words per minute count relating to number of words orally read out by the user every minute,
a correct word per minute count relating number of correct words orally read out by the user every minute,
an insertion information related to additional words added by the user to the text in the target transcription,
a deletion information related to words omitted by the user to the text in the target transcription,
a substitution information related to words replaced by different words to the text in the target transcription,
a prolonging information relates to additional time taken by the user to read a word in comparison to the time taken to read the same word by the reference person,
an interjection information relates to words in the target transcription which are not part of a dictionary,
a repetition information relates to words which are same and are placed adjacent to each other in target transcription,
an intensity information relates to intensity of at least each of the words or phonemes in the target audio, or combination thereof,
a pitch information relates to pitch of at least each of the words or phonemes in the target audio, or combination thereof,
a pause information relates to pauses taken by the user in the target audio,
a phoneme information relates to phonemes in the target audio, or combination thereof.

The object of the invention is also achieved by a computer program product stored on a non-transitionary computer readable medium and which can be executed on one or more processors, wherein the non-transitory computer readable medium and the one or more processors are adapted to be coupled to a communication network interface. The computer program product on execution to enable the one or more processors to perform the following steps comprising:

receiving a target audio from a user via an input unit, wherein the target audio relates to oral reading of the text by the user;
processing the target audio and generating a target transcription of the target audio;
receiving and processing at least one of the target transcription, the text, the target audio, or a reference audio, or combination thereof, wherein the reference audio relates to oral reading of the text by a reference person, and based on processing, to generate a primary metrics comprising at least one of:
a count of total number of words in the text,
a count of number of words in the target transcription,
a count of correct number of words correctly read by the user from the text,
a words per minute count relating to number of words orally read out by the user every minute, a correct word per minute count relating number of correct words orally read out by the user every minute, an insertion information related to additional words added by the user to the text in the target transcription, a deletion information related to words omitted by the user to the text in the target transcription, a substitution information related to words replaced by different words to the text in the target transcription, a prolonging information relates to additional time taken by the user to read a word in comparison to the time taken to read the same word by the reference person, an interjection information relates to words in the target transcription which are not part of a dictionary, a repetition information relates to words which are same and are placed adjacent to each other in target transcription, an intensity information relates to intensity of at least each of the words or phonemes in the target audio, or combination thereof, a pitch information relates to pitch of at least each of the words or phonemes in the target audio, or combination thereof, a pause information relates to pauses taken by the user in the target audio, a phoneme information relates to phonemes in the target audio, or combination thereof.

BRIEF DESCRIPTION OF DRAWINGS

FIG. 5 illustrates a fluency report based on the deletions.

FIG. 6 illustrates a fluency report based on the insertion of new words.

FIG. 7 illustrates a fluency report based on substituted words.

FIG. 10 illustrates a representation of a prolonging/tachylalia graph by comparing reading carried out by a user and a reference person using the intensity data.

FIG. 12 illustrates a representation of a repetition fluency report of a user.

The figures depict embodiments of the disclosure for purposes of illustration only. One skilled in the art will readily recognize from the following description that alternative embodiments illustrated herein may be employed without departing from the principles of the disclosure described herein.

DETAILED DESCRIPTION

The best and other modes for carrying out the present invention are presented in terms of the embodiments, herein depicted in drawings provided. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures, or additional components. Appearances of the phrase "in an embodiment", "in another embodiment" and similar language throughout this specification may, but not necessarily do, all refer to the same embodiment.

The invention focuses on measuring reading fluency or progress in reading fluency of a user who is using systems and methods of the current invention. Initially, the user is asked to read a text, and while the user is reading the text, his audio is captured. In furtherance, this captured audio is analyzed to measure oral fluency of the user in the oral reading of the text. Over time, the user's fluency in reading the text can change. The invention also provides for mechanisms to keep a track of the measurement of progress in the reading fluency of a user.

Figure 1:
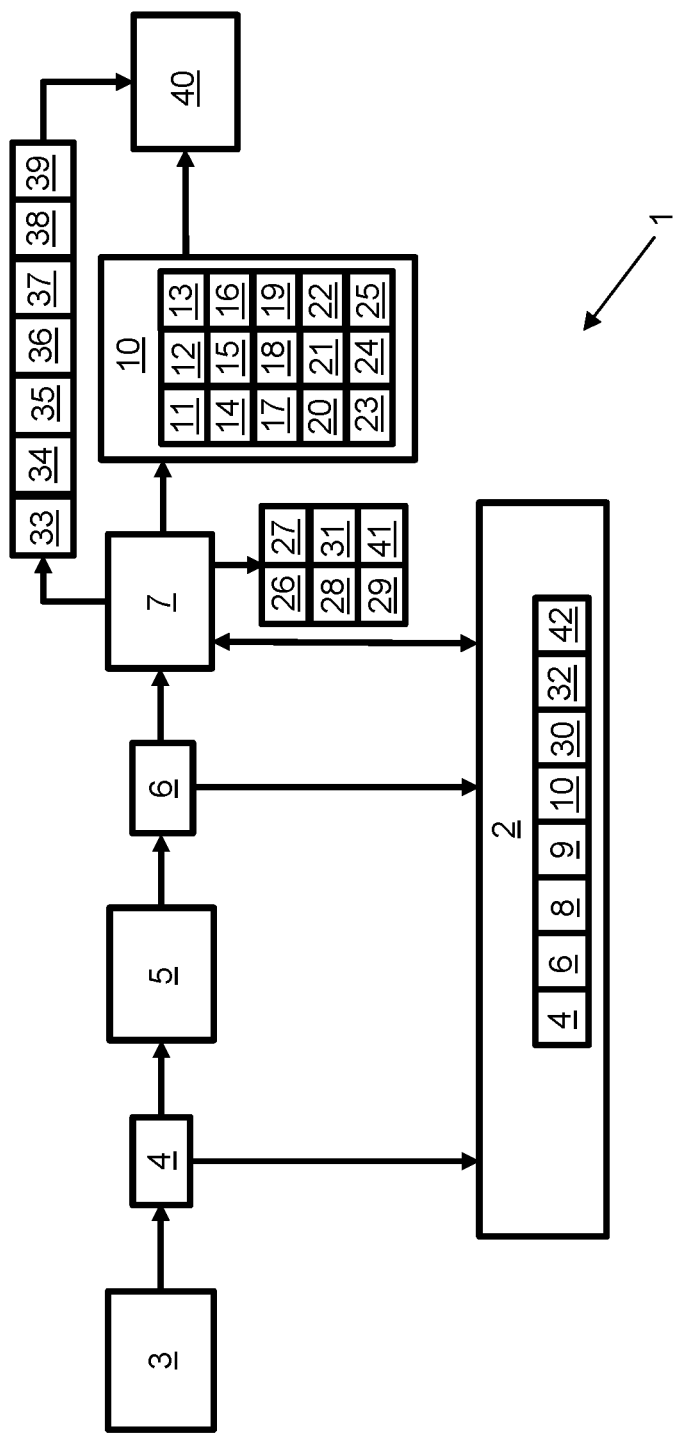
FIG. 1 illustrates a system for analyzing an audio to measure fluency or progress in fluency in a text illustrated through the audio.

FIG. 1 illustrates a schematic diagram of a system 1 which analyses a target audio 4 to measure fluency or progress in fluency of the user while reading a text 8. The system 1 includes an input unit 3, a transcribing unit 5, and a processing unit 7, which cooperates to measure the reading fluency of a user. The input unit 3 receives the target audio 4 from the user which is further forwarded to the transcribing unit. Along with sending the target audio 4 to the transcribing unit, it is also sent to a memory device 2 for storage, so that it can be reutilized for processing in the future. The transcribing unit 5 receives and processes the target audio 4 and generates a target transcription 6 of the target audio 4. This target transcription 6 is further sent to the processing unit 7 along with the target audio 4. The processing unit 7 also fetches the text 8, and a reference audio 9 from the memory device 2, and further processes them along with the target transcription 6 and the target audio 4. The reference audio 9 relates to an oral reading of the text by a reference person. Based on such processing, the processing unit 7 generates a primary metrics 10 which includes various parameters of measurement of reading fluency of the user. It is to be noted that all the parameters may not be generated, and only the parameters which are desired to measure the reading fluency of the user are only generated. Various parameters of the primary metrics 10 are further detailed below.

The processing unit 7 processes the text 8 and carries out a total count of the number of words in the text to determine a count of the total number of words 11. Also, the processing unit 7 further carries out a similar count operation onto the target transcription 6 to determine a count of number of words 12 in the target transcription 6.

The processing unit 7 further determines another parameter of the primary metrics, i.e., a count of the correct number of words 13 correctly read by the user from the text 8. The processing unit 7 processes the text 8 and the target transcript 6 by comparing each word in the text 8 at a particular position to each word in the target transcript 6 at the same position. Based on the number of matches after such comparison, the count of correct number of words 13 is generated by the processing unit.

Another parameter, i.e., words per minute count 14 relating to number of words orally read out by the user every minute is measured by the processing unit 7. The processing unit 7 processes the target audio 4 and calculates a target duration 26 related to duration of the target audio 6. Further, the processing unit 7 processes the count of number of words 12 in the target transcription 6 and the target duration 26 mathematically and generates the words per minute count 14.

The next parameter generated by the processing unit 7 is a correct word per minute count 15 relating to the number of correct words orally read out by the user every minute. For this, the processing unit 7 firstly processes the target audio 4 to determine the target duration 26 related to duration of the target audio 4. Thereafter, the processing unit 7 processes the count of correct number of words 13 correctly read by the user from the text 8 and the target duration 26 programmatically, and generates the correct word per minute count 15.

Figure 11:
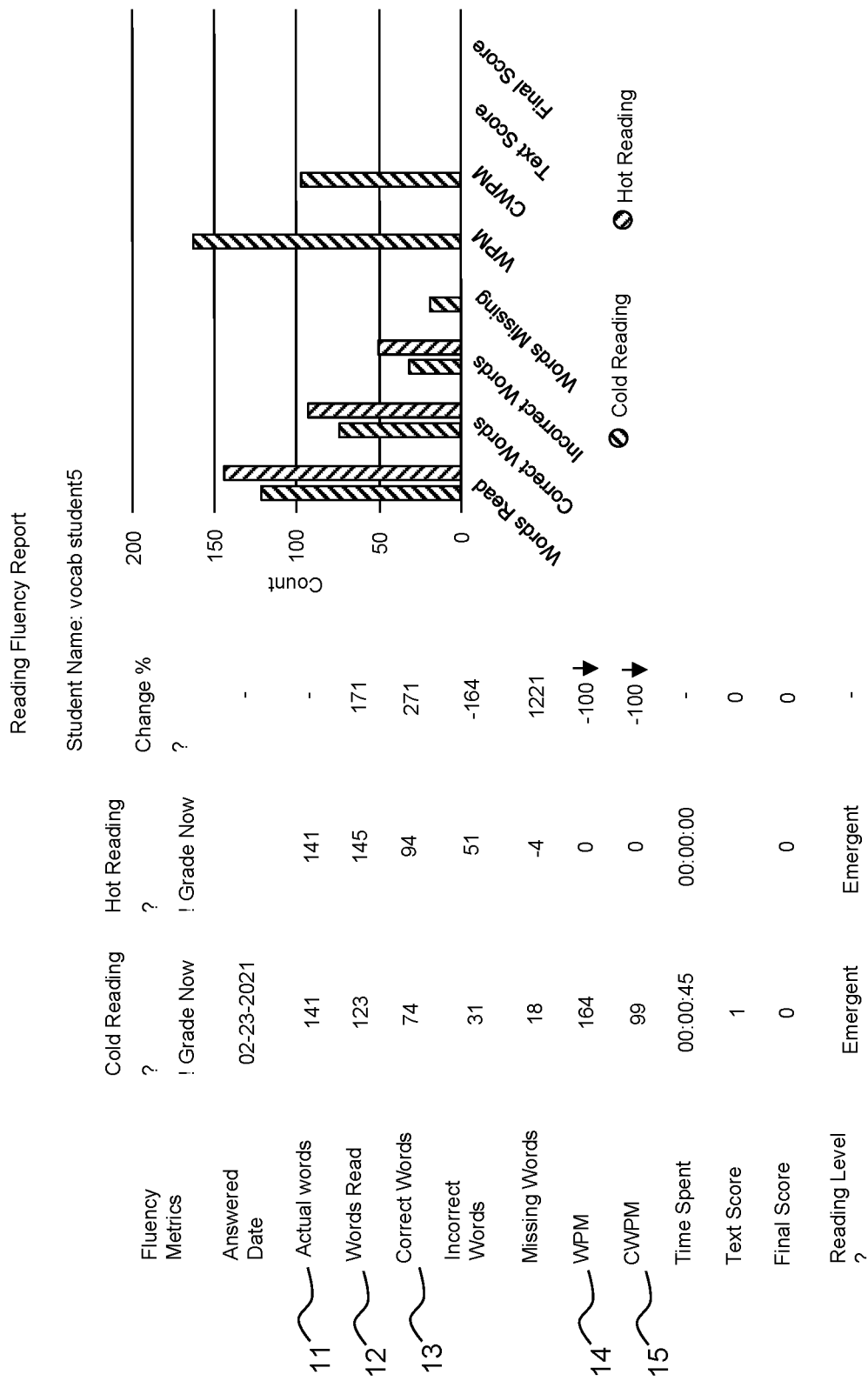
FIG. 11 illustrates a representation of a prolonging/tachylalia graph by comparing reading carried out by a user and a reference person using the pitch data.

In one embodiment, the parameter of metrics 10, including count of total number of words 11 in the text, count of number of words 12 in the target transcription, count of correct number of words 13 read by user, word per minute count 14 of words orally read out by the user, and correct words per minute count 15 of words orally read out by the user are shown in a consolidated reading fluency report, as shown in FIG. 11. These parameters are shown in both, tabular format, and as well as, a bar chart. The figure shows an implementation where a student is the user of the system, and he carries out two readings of the text. The first reading is referred to as Cold reading, and the second reading is referred to as hot reading. The comparison between both the readings clearly shows progress in the fluency of the student across two readings. In addition to the above parameters, the report also shows the time duration of the reading, and also the number of words missed out to be read. The time duration can be generated by processing the target audio, and the count of missing words can be identified by comparing the original text, and the target transcription.

Insertion related information 16 which relates to additional words added by the user to the text 8 in the target transcription 6, is another parameter of the primary metrics 10 which is generated by the processing unit 7. The processing unit 7 compares the text 8 and the target transcription 6, and identifies one or more inserted words in the target transcription 6 which were not part of the text 8. The processing unit 7 also determines all such inserted words and also the position of the inserted words in the target transcription 6. In one embodiment, the processing unit 7 may not identify the position of the inserted word and only lists out the inserted words. However, to provide holistic understanding, it is relevant to even determine the position in the text where the word was inserted. In furtherance, in another embodiment, the processing unit 7 processes the target audio 4 along with the text 8, and the target transcription 6 and determines one or more of the following: an insertion intensity related to intensity of inserted word, an insertion pitch related to pitch of inserted word, a start time of inserted word in the target audio, and an end time of the inserted word in the target audio as part of the insertion information 16. The information on pitch and intensity, and timings of insertion of the words, shall give further understanding about the inserted words, and help to give an even more detailed picture of the insertion related reading fluency.

Another parameter of the primary metrics 10 is a deletion information 17 which relates to words omitted by the user to the text 8 in the target transcription 6. The processing unit 7 compares the text 8, and the target transcription 6, and based on such comparison identifies one or more omitted words that were omitted in the target transcription 6. The processing unit 7 also further determines all such omitted words and also the position of the omitted words in the text 8. In an alternate embodiment, only the omitted words can be listed out without providing their position in the text 8. However, to provide holistic understanding, it is relevant to even determine the position in the text from where the word was omitted.

Another parameter of the primary metrics 10 is a substitution information 18 which relates to words replaced by different words to the text 8 in the target transcription 6. The processing unit 7 compares the text 8 and the target transcription 6, and identifies one or more substituted words in the target transcription 6 which were substituted by the user while reading out the text 8. The processing unit 7 also determines all such inserted words and position of the substituted words in the target transcription 6 and the position of the corresponding word, which is substituted, in the text 8. In an alternate embodiment, the information of the position of the words substituted and the corresponding words in the text 8 is not provided, rather a list of substituted words can be provided along with the words it is substituted to. However, to provide holistic understanding, it is significant to even determine the position of the substituted word in the target transcription 6, and that of the corresponding word, which has been substituted in the text. In another embodiment, the processing unit 7 processes the target audio 4 along with the text 8 and the target transcription 6, and determines one or more of the following: a substitution intensity related to intensity of substituted word, a substitution pitch related to pitch of substituted word, a start time of substituted word in the target audio, and an end time of the substituted word in the target audio. The information on pitch and intensity, and timings of substitution of the words, shall give further understanding about the substituted words, and help to give an even more detailed picture of the substitution related reading fluency.

The insertion information 16, the deletion information 17, and the substitution information 18 generated by the processing unit 7 can directly be rendered onto a display unit for further review and assessment by the user or a supervisor or teacher of the user. However, to make the information to be consumed easily, a further processed fluency report 33 is generated, which shows the information 16, 17, 18 in an easily assessable and consumable format. The processing unit 7 receives and processes the insertion information 16, the deletion information 17, and the substitution information 18 along with the target transcription 6 and the text 8, and generates a fluency report 33 showing various words omitted, substituted, or added by the user while reading the text 8. The words omitted, substituted, and added are annotated differently for easy understanding. Separate annotation can be shown by different colors, or different formatting of the words for each type of deficiency in fluency. In another embodiment, the fluency report 33 can separately be generated for each of the insertion information 16, the deletion information 17, and the substitution information 18, and in such scenario, the separate annotation of each of them is not required. In yet another embodiment, the fluency report 33 can be shown for any of the pairs from the insertion information 16, the deletion information 17, and the substitution information 18, and in such scenario, the separate annotation shall be required to be shown for different types of deficiency in fluency present in the report. FIGS. 5, 6, and 7 show fluency report 33 separately for deletion, insertion, and substitution respectively. The figures represent an embodiment where the comparison of the readings is carried between a student and a teacher. The student is the user of the system, while the Teacher is the reference person. The student carries out reading of the text 8 two times. The first time reading of the student is referred to as Cold reading, and the second time reading is referred to as Hot reading. For the purpose of comparison, with respect to substitution, and insertion, the original text 8 is also shown along with annotation of words onto the target transcription 6. In FIG. 6, the words inserted are annotated on the target transcription 6, while in FIG. 7, the words substituted are annotated on the target transcription 6. While the words deleted are annotated on the original text 8, as shown in FIG. 5.

Figure 3:
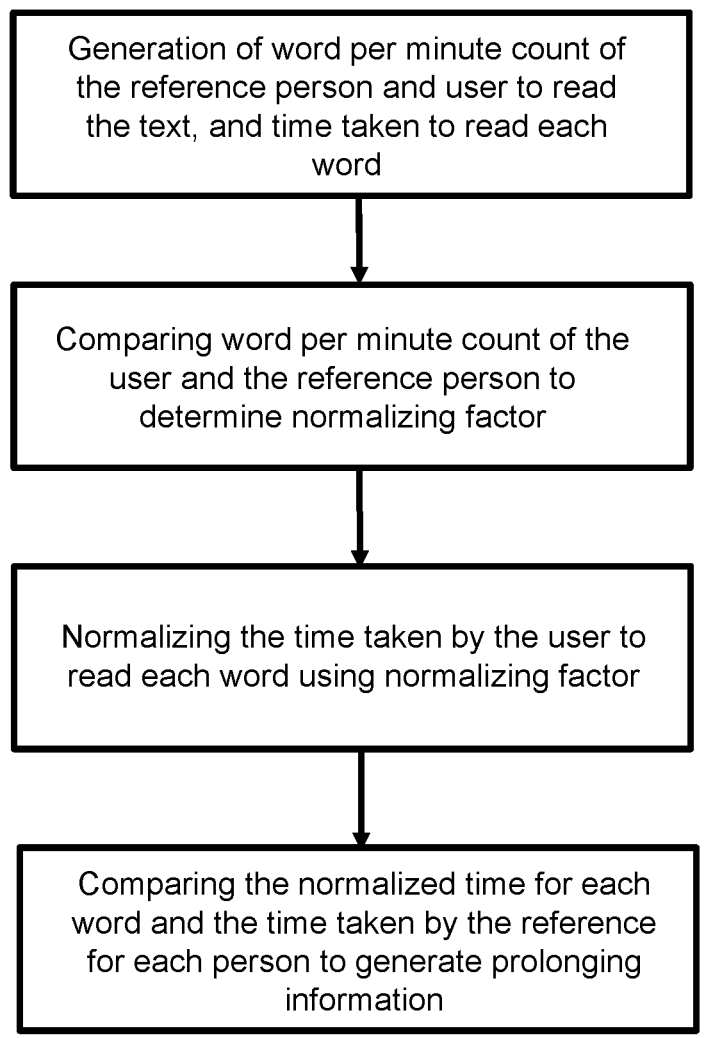
FIG. 3 illustrates a flowchart showing method for generating prolonging information.

Another parameter of the primary metrics 10 is a prolonging information 19 which relates to additional time taken by the user to read a word in comparison to the time taken to read the same word by the reference person. The prolonging information 19 is generated through the method shown in FIG. 3. Firstly, the processing unit 7 processes the target audio 4 and the target transcription 6 and generates a target words per minute 14 taken by the user to orally read out all the words in target transcription 6, and a target time 27 taken by the user to orally read out each of the word in target transcription 6. Thereafter, the processing unit 7 processes the reference audio 9 and the text 8, and generates the reference words per minute 41 taken by the reference person to orally read out all the words in the text 8 and a reference time taken 28 taken by the reference person to orally read out each of the word in the text 8. In furtherance, the processing unit 7 compares the target words per minute count 14 and the reference words per minute count 41 and determines a normalizing factor by dividing the reference words per minute count 41 and the target words per minute count 14. In the next step, the processing unit 7 normalizes the target time 27 with the normalization factor by multiplying the target time 27 with the normalization factor and generates a normalized target time 29 for each word. In furtherance, the processing unit 7 processes the normalized target time 29 and the reference time 28 for each of the corresponding information to deduce a prolonging ratio and to compare the prolonging ratio and a prolonging threshold if the prolonging ratio is more than the prolonging threshold, the processing unit 7 determines such words and their position as prolonging information 19. In an alternate embodiment, the information of the position of the prolonged words is not provided, rather just the word prolonged are listed out. However, to provide holistic understanding, it is significant to even determine the position of the prolonged words. In another embodiment, the processing unit 7 further determines one or more of the following: a prolonging intensity related to intensity of prolonged word, a prolonging pitch related to pitch of prolonged word, a start time of prolonged word in the target audio, and an end time of the prolonged word in the target audio as part of the prolonging information 19. The information on pitch and intensity, and timings of the prolonged words, shall give further understanding about the prolonged words, and help to give an even more detailed picture of the prolonging related reading fluency.

The prolonging information 19 so generated is directly rendered onto the display unit. Also, to make the deficiency in fluency more understandable and visual, a prolonging graph 34 is generated by the processing unit after further processing of the prolonging information 19. The prolonging graph 34 shows words that were prolonged and a time taken by the user to read the prolonged word with respect to a time taken by the reference person to read the word through a bar chart, as shown in FIG. 10. The bar chart shows the comparison of time taken to read out words by the teacher, which is a reference person here, and a student, which is the user here. For comparison, two readings are taken up. The first reading carried out by the student is named as the Cold reading. The second reading carried out by the student, which is called Hot reading. In the Bar chart, the prolonging comparison is shown for the different set of words during Cold reading, as well as Hot reading Another parameter of the primary metrics 10 is an interjection information 20 relating to words in the target transcription 6 which are not part of a dictionary. The processing unit 7 processes the target transcription 6 by comparing with a dictionary of words 30, and based on such comparison, generates a confidence score 31 for each of the words in the target transcription 6. The processing unit 7 further compares the confidence score 31 with an interjection threshold 32, and if the confidence score 31 of the word is less than the interjection threshold 32 then the processing unit determines such word as interjection information 20.

The processing unit 7 processes the target transcription 6 by comparing with the dictionary of words 30 and based on such comparison, add a new word that was not found in the dictionary 30 to a custom dictionary 42. The new words could also include solfège syllables used in music. Solfège is a music education method used to teach aural skills, pitch and sight-reading of Western music. Solfège Syllables are assigned to the notes of the scale and enable the musician to audiate, or mentally hear, the pitches of a piece of music being seen for the first time and then to sing them aloud.

For comprehensiveness, an interjection fluency report is generated by the processing unit 7. The processing unit 7 receives and processes the interjection information 20 and the target transcription 6, and generates the interjection fluency report with words determined to be the interjection onto the target transcription 6. Both the interjection information 20 and the interjection fluency report is rendered on the display unit. In another embodiment, only the interjection fluency report is rendered onto the display unit.

Another parameter of the primary metrics 10 is a repetition information 21 which relates to words that are the same and are placed adjacent to each other in target transcription 6. The processing unit 7 processes the target transcription 6 by comparing adjacent words, and if the adjacent words are identified to be repetition, then those words are determined as repetition information 21 along with positions of such words. In an alternate embodiment, the information of the position of the repeated words is not provided, rather just the repeated words are listed out. However, to provide holistic understanding, it is significant to even determine the position of the repeated words. In another embodiment, the processing unit 7 further processes the target transcription 6 and the target audio 4, and determine one or more of the following: a repetition intensity related to intensity of repeated words, a repetition pitch related to pitch of repeated words, a start time of repeated words in the target audio, and an end time of the repeated words in the target audio as part of the repetition information 21. The information on pitch and intensity, and timings of the repeated words, shall give further understanding about the repeated words, and help to give an even more detailed picture of the repetition related deficiency in fluency.

For better understanding and visuals, a repetition fluency report 35 is generated by the processing unit 7. The processing unit 7 receives and processes the repetition information 21 and the target transcription 6 and generates a repetition fluency report 35 with words determined to be the repetitions onto the target transcription 6. Both the repetition information 21, and the repetition fluency report 35 are rendered onto the display unit. In an alternate embodiment, only the repetition fluency report 35 is rendered onto the display unit. FIG. 12 shows an exemplary repetition fluency report 35 generated from an exemplary implementation of the system. The figure represents an embodiment where a student, who is the user of the system, carries out reading of the text 8 two times. The first time reading of the student is referred as Cold reading, and the second time reading is referred to as Hot reading. Both the time no words were determined to be repeated, and hence no annotations were made onto the text 8. This repetition fluency report 35 clearly shows no repetitions made by students during the Hot reading, as well as, Cold reading.

Another parameter of the primary metrics 10 is a pause information 24 which relates to pauses taken by the user in the target audio 4. The processing unit 7 processes the target transcription 6 and the target audio 4, and determines duration between each pair of words in the target transcription as pause information 24. The processing unit 7 identifies a time instance the first word ends and another time instance when the second word starts in the pair of words, and thus calculates a time difference between the reading out of the words, and determines such duration as pause information 24.

Another parameter of the primary metrics 10 is a phoneme information 25 relates to phonemes in the target audio 4. The processing unit 7 processes the target transcription 6 and the target audio 4 and identifies phonemes in each word of the target transcription as phoneme information 25. In one embodiment, the processing unit 7 also determines one or more of the following: a phoneme intensity related to intensity of each phoneme, a phoneme pitch related to pitch of repeated phoneme, a start time of each phoneme in the target audio, and an end time of each phoneme in the target audio as part of the phoneme information 25. The information on pitch and intensity, and timings of the phonemes, shall give further understanding about phonemes and the way they are orally read out, and help to give an even more detailed picture of the reading fluency of the user.

Figure 4:
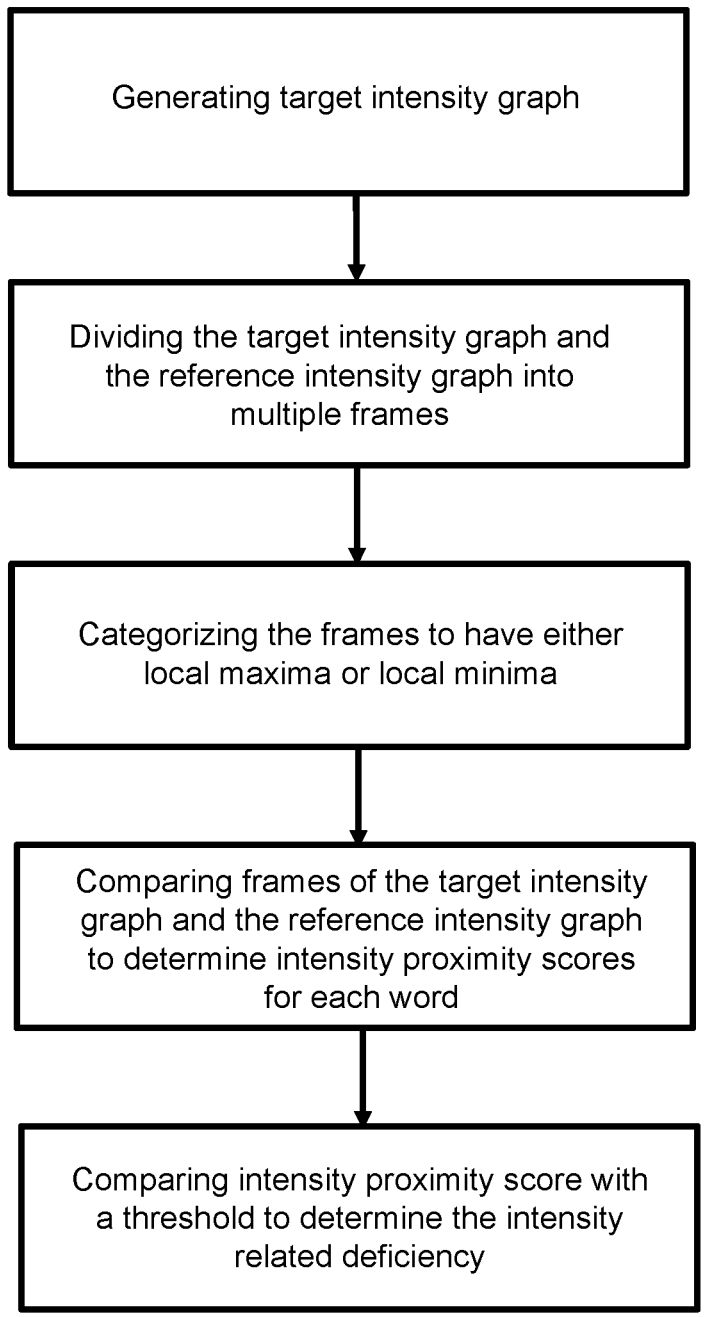
FIG. 4 illustrates a flowchart showing method for determining intensity related fluency for the words read by a user.
Figure 8:
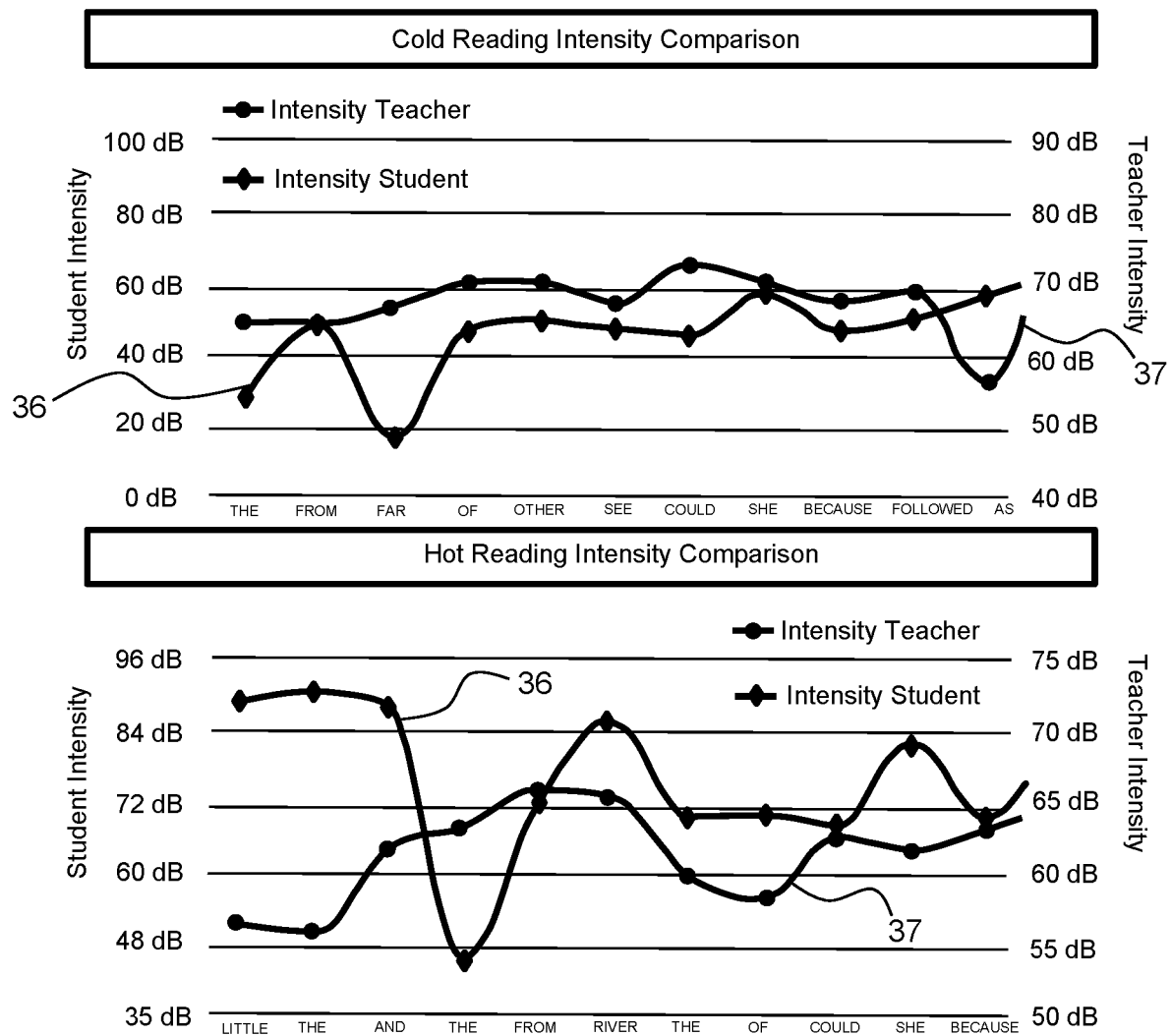
FIG. 8 illustrates an intensity curve comparison of reading carried out by a user and a reference person.

Another parameter for the primary metrics 10 is an intensity information 22 which relates to intensity of at least each of the words or phonemes in the target audio 4, or combination thereof. The processing unit 7 processes the target audio 4 and target transcription 6 to generate the intensity information 22. In furtherance, the processing unit 7 determines the intensity related disfluency for the words read as per the target audio 4. The flowchart of such processing to generate the intensity related disfluency is illustrated through FIG. 4. For determining the same, firstly the processing unit 7 receives and processes the intensity information 22 and generates a target intensity graph 36 related to intensity of each word read by the user. Further, the processing unit 7 divides the target intensity graph 36 and a reference intensity graph 37 into multiple frames on a time scale and categorize each of the frames to either have local maxima (rising) or local minima (falling) with respect to a previous frame in each of the intensity graphs 36, 37. The reference intensity graph 37 relates to intensity of each word read by the reference person. In the next step, the processing unit 7 compares each of the categorized frames in the target intensity graph 36 with corresponding categorized frames in the reference intensity graph 37. And, based on the comparison, the processing unit 7 determines an intensity proximity score of the intensities of each of the corresponding words read by the user and the reference person. A lower proximity score refers to intensity related disfluency for that specific word. The intensity information 22, the graphs 36, 37, and words having intensity related disfluency are rendered onto the display unit. In one embodiment, only the graphs 36, 37 with specific annotation of words having intensity related disfluency onto the graphs 36, 37 are rendered onto the display unit. FIG. 8 shows one such intensity comparison graph 36, 37 which compares intensity of readings of a teacher, which is a reference person, and student, who is the user of the system, in two different rounds of readings, a cold reading, and a hot reading. The graphs 36, 37 are showing comparison for different sets of words during cold reading and hot reading. However, the comparison can also be shown for the same set of words during the cold reading and the hot reading. On X-axis the words are shown which are lying in the sequence in the text, and on Y-axis intensity is marked on different scale for student and teacher.

Figure 9:
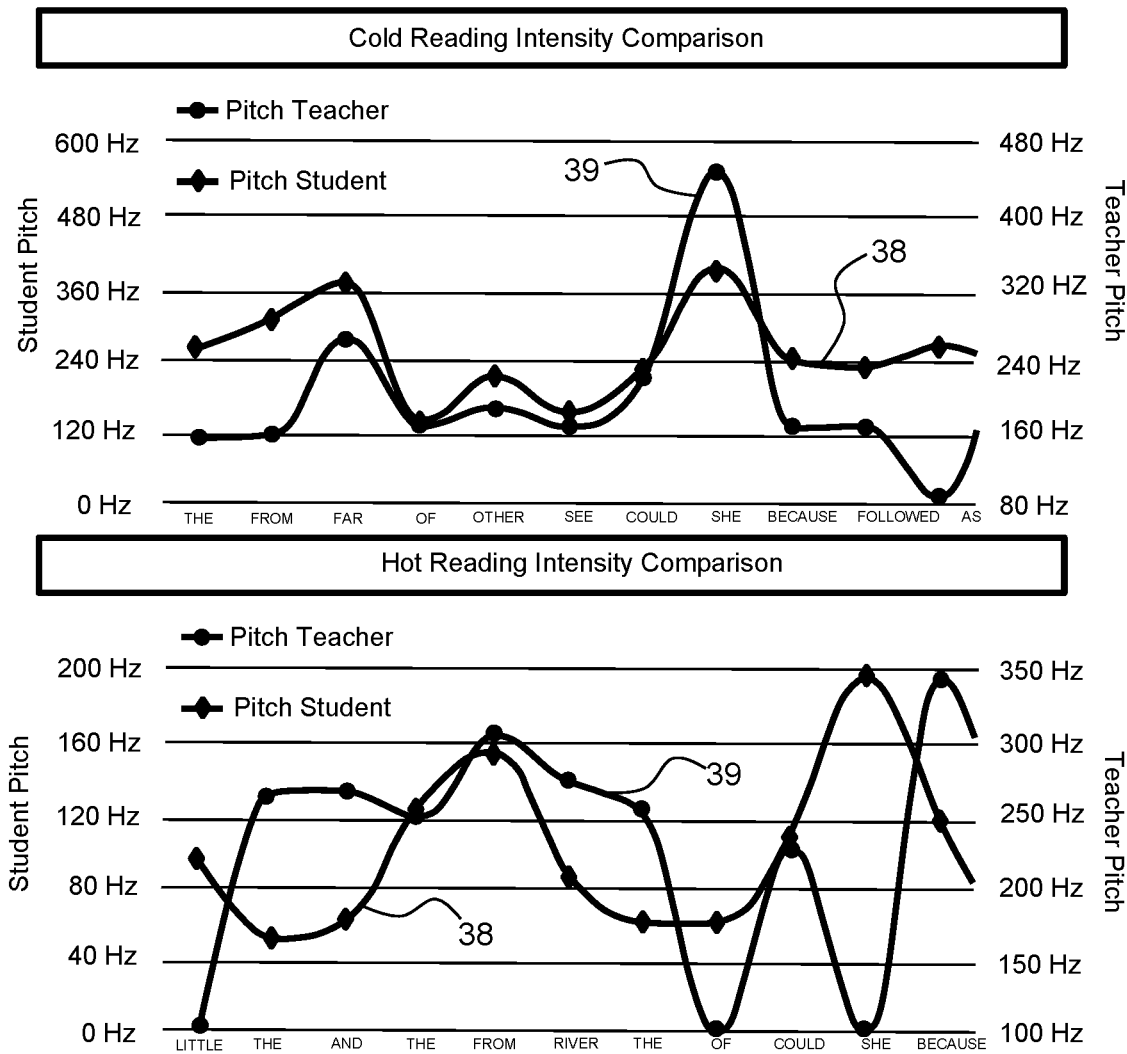
FIG. 9 illustrates pitch curve comparison of reading carried out by a user and a reference person.

Another parameter for the primary metrics 10 is a pitch information 23 relating to pitch of at least each of the words or phonemes in the target audio 4, or combination thereof. The processing unit 7 processes the target audio 4 and target transcription 6 to generate the pitch information 23. In furtherance, the processing unit 7 determines the pitch related disfluency for the words read as per the target audio 4. For determining the same, the processing unit 7 receives and processes the pitch information 23 and generates a target pitch graph 38 related to pitch of each word read by the user. Further, the processing unit 7 divides the target pitch graph 38 and a reference pitch graph 39 into multiple frames on a time scale and categorize each of the frames to either have local maxima (rising) or local minima (falling) with respect to a previous frame in each of the pitch graphs 38, 39. The reference pitch graph 39 relates to pitch of each word read by the reference person. In the next step, the processing unit 7 compares each of the categorized frames in the target pitch graph 38 with corresponding categorized frames in the reference pitch graph 39. And, based on the comparison, the processing unit 7 determines a pitch proximity score of the pitches of each of the corresponding words read by the user and the reference person. A lower proximity score refers to pitch related disfluency for that specific word. The pitch information 23, the graphs 38, 39, and words having pitch related disfluency are rendered onto the display unit. In one embodiment, only the graphs 38, 39 with specific annotation of words having pitch related disfluency onto the graphs 38, 39 are rendered onto the display unit. FIG. 9 shows one such pitch comparison graph 38, 39 which compares pitch of readings of a teacher, which is a reference person, and student, who is the user of the system, in two different rounds of readings, a cold reading, and a hot reading. Graphs 38, 39 are showing a comparison for a different set of words during cold reading and hot reading. However, the comparison can also be shown for the same set of words during the cold reading and the hot reading. On X-axis the words are shown which are lying in the sequence in the text, and on Y-axis pitch is marked on a different scale for the student and the teacher.

Figure 2:
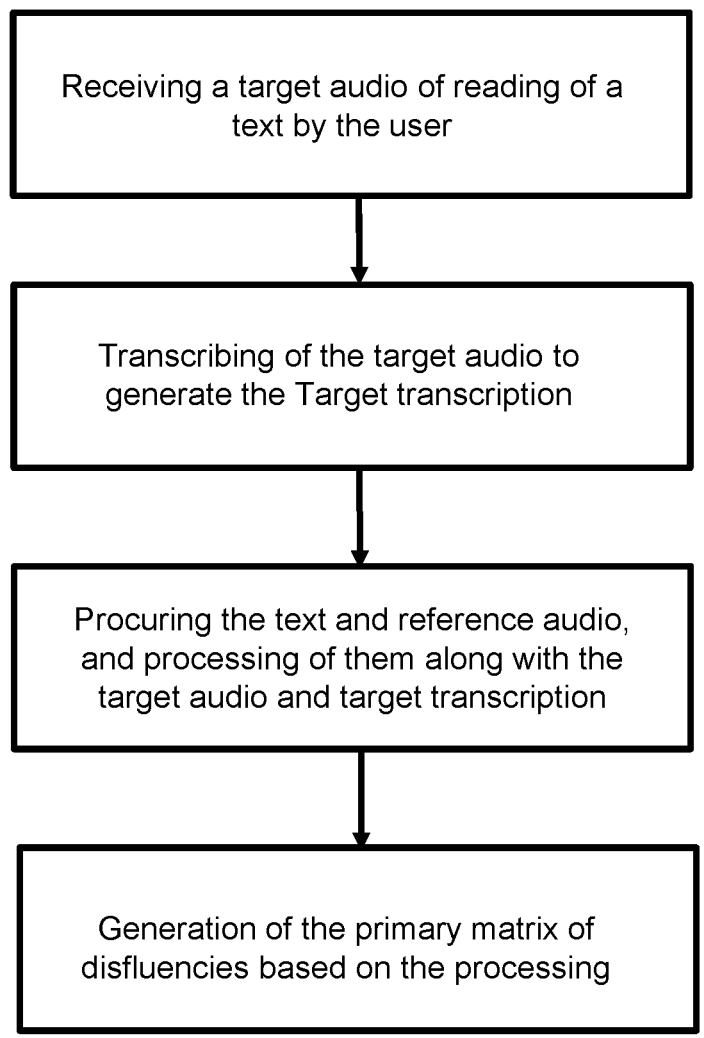
FIG. 2 illustrates a flowchart showing method for measuring fluency or progress in fluency in a text illustrated through the audio.

FIG. 2 illustrates a method for measuring fluency or progress in fluency in a text illustrated through the audio through a flow chart. The method includes the following steps. Firstly, a target audio is received from a user using an input unit. Thereafter, the target audio is sent to the transcribing unit, which processes the target audio and generates a target transcription of the target audio. In the next step, a processing unit receives the target transcription from the transcribing unit, and the target audio from the input unit or memory device, and also procures a text which is read by the user and the reference person and a reference audio which is audio of the reference person for reading the text. In the next step, the processing unit further processes the target transcription, the text, the target audio, and the reference audio and generates the primary metrics. The primary metrics have the same parameters as elaborated while explaining in FIG. 1. It is to be noted that all the parameters of the primary metrics need not be generated, and only those parameters are generated which are required for assessing the reading deficiency in fluency. Accordingly, all of the target transcription, the text, the target audio, and the reference audio are not required, and the processing unit receives the requisite of the target transcription, the text of the text, the target audio, and the reference audio which are utilized in the generation of the desired parameters of the primary metrics.

While specific language has been used to describe the invention, any limitations arising on account of the same are not intended. As would be apparent to a person skilled in the art, various working modifications may be made to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

LIST OF REFERENCE NUMERALS

1 System
2 Memory device
3 Input unit
4 Target audio
5 Transcribing unit
6 Target transcription
7 Processing unit
8 Text
9 Reference audio
10 Primary metrics
11 Count of total number of words in the text
12 Count of number of words in the target transcription
13 Count of correct number of words read by user
14 Word per minute count of words orally read out by user
15 Correct words per minute count of words orally read out by user
16 Insertion information
17 Deletion information
18 Substitution information
19 Prolonging information
20 Interjection information
21 Repetition information
22 Intensity information
23 Pitch information
24 Pause information
25 Phoneme information
26 Target duration
27 Target time
28 Reference time
29 Normalized Target time
30 Dictionary of words
31 Confidence score
32 Interjection threshold
33 Fluency report
34 Prolonging graph
35 Repetition fluency report
36 Target Intensity graph
37 Reference Intensity graph
38 Target Pitch graph
39 Reference Pitch graph
40 Display unit
41 Reference total time
42 Custom Dictionary

What is claimed is:

1. A system (1) for analyzing an audio to measure oral reading fluency or progress in oral reading fluency (2) in a text (8) illustrated through the audio, the system (1) comprising:

an input unit (3) adapted to receive a target audio (4) from a user, wherein the target audio (4) relates to recording of oral reading of the text (8) by the user;

a transcribing unit (5) adapted to receive and process the target audio (4) and to generate a target transcription (6) of the target audio (4);

a processing unit (7) adapted to receive and process at least one of the target transcription (6), the text (8), the target audio (4), or a reference audio (9), or combination thereof, wherein the reference audio (9) relates to an oral reading of the text by a reference person, and based on processing, to generate a primary metrics (10) comprising:

a count of total number of words (11) in the text (8), a count of number of words (12) in the target transcription (6), a count of correct number of words (13) correctly read by the user from the text (8), a target words per minute count (14) relating to number of words orally read out by the user every minute, a correct word per minute count (15) relating to number of correct words orally read out by the user every minute, an insertion information (16) related to additional words added by the user to the text (8) in the target transcription (6), a deletion information (17) related to words omitted by the user to the text (8) in the target transcription (6), a substitution information (18) related to words replaced by different words to the text (8) in the target transcription (6), a prolonging information (19) relates to additional time taken by the user to read a word in comparison to the time taken to read the same word by the reference person, an interjection information (20) relates to words in the target transcription (6) which are not part of a dictionary, a repetition information (21) relates to words which are same and are placed adjacent to each other in target transcription (6), an intensity information (22) relates to intensity of at least each of the words or phonemes in the target audio (4), or combination thereof, a pitch information (23) relates to pitch of at least each of the words or phonemes in the target audio (4), or combination thereof, a pause information (24) relates to pauses taken by the user in the target audio (4), a phoneme information (25) relates to phonemes in the target audio (4), or combination thereof, wherein the processing unit is adapted to receive and process the prolonging information (19), and to generate a prolonging graph (34) showing words which were prolonged and a time taken by the user to read to prolonged word with respect to a time taken by the reference person to read the word, wherein the processing unit (7) is adapted to receive and process the intensity information (22) and generate a target intensity graph (36) related to intensity of each word and/or phoneme read by the user, to divide the target intensity graph (36) and a reference intensity graph (37) into multiple frames on a time scale, to categorize each of the frames to either have local maxima (rising) or local minima (falling) with respect to a previous frame in each of the intensity graphs (36, 37), to further compare each of the categorized frames in the target intensity graph (36) with corresponding categorized frames in the reference intensity graph (37), based on comparison, to determine a intensity proximity score of the intensities of each of the corresponding words read by the user and the reference person, wherein the reference intensity graph (37) relates to intensity of each word read and/or phoneme by the reference person, wherein the processing unit (7) is adapted to receive and process the pitch information (23) and generate a target pitch graph (38) related to pitch of each word read by the user to divide the target pitch graph (38) and a reference pitch graph (39) into multiple frames on a time scale, to categorize each of the frames to either have local maxima (rising) or local minima (falling) with respect to a previous frame in each of the pitch graphs (38, 39), to further compare each of the categorized frames in the target pitch graph (38) with corresponding categorized frames in the reference pitch graph (39) based on the comparison, to determine a pitch proximity score of the pitches of each of the corresponding words read by the user and the reference person, wherein the reference pitch graph (39) relates to pitch of each word read by the reference person, wherein the prolonging graph (34), the target intensity graph (36), the reference intensity graph (37), the target pitch graph (38), and the reference pitch graph (39) are directly rendered on a display unit as the user is reading.

2. The system (1) according to claim 1, wherein the processing unit (7) is adapted to process the text (8) and the target transcript (6) by comparing each word in the text (8) at a particular position to each word in the target transcript (6) at the same position, and to generate the count of correct number of words (13) correctly read by the user from the text, and to optionally process the target audio (4) to determine a target duration (26) related to duration of the target audio (4), the processing unit (7) is further adapted to process count of correct number of words (13) correctly read by the user from the text (8) and the target duration (26) to generate the correct word per minute count (15) relating number of correct words orally read out by the user every minute.

3. The system (1) according to claim 1, wherein the processing unit (7) is adapted to process the target audio (4) to determine a target duration (26) related to duration of the target audio (6), the processing unit (7) is further adapted to process the count of number of words (13) in the target transcription (6) and the target duration (26) to generate the words per minute count (14) relating to number of words orally read out by the user every minute.

4. The system (1) according to the claim 1, wherein the processing unit (7) is adapted to compare the text (8), and the target transcription (6) to identify one or more inserted words in the target transcription (6) which were not part of the text (8), and to determine all such inserted words and optionally position of the inserted words in the target transcription (6) as the insertion information (16), the processing unit (7) is optionally adapted to process the target audio (4) along with the text (8), and the target transcription (6) to determine at least one of a insertion intensity related to intensity of inserted word, a insertion pitch related to pitch of inserted word, a start time of inserted word in the target audio, or an end time of the inserted word in the target audio, or combination thereof as the insertion information (16).

5. The system (1) according to the claim 1, wherein the processing unit (7) is adapted to compare the text (8), and the target transcription (6) to identify one or more omitted words which were omitted in the target transcription (6), and to determine all such omitted words and optionally position of the omitted words in the text (8) as the deletion information (17).

6. The system (1) according to the claim 1, wherein the processing unit (7) is adapted to compare the text (8), and the target transcription (6) to identify one or more substituted words in the target transcription (6) which were substituted by the user while reading out the text (8), and to determine all such inserted words and optionally position of the substituted words in the target transcription (6) and position of the corresponding word, which is substituted, in the text (8) as the substitution information (18), the processing unit (7) is optionally adapted to process the target audio (4) along with the text (8), and the target transcription (6) to determine at least one of a substitution intensity related to intensity of substituted word, a substitution pitch related to pitch of substituted word, a start time of substituted word in the target audio, or an end time of the substituted word in the target audio, or combination thereof as the substitution information (18).

7. The system (1) according to the claim 1, wherein the processing unit (7) is adapted:

to process the target audio (4) and the target transcription (6) to generate a target words per minute count (14) taken by the user to orally read out words in target transcription (6), and a target time (27) taken by the user to orally read out each of the word in target transcription (6),
to process the reference audio (9) and the text (8) to generate the reference words per minute count (41) taken by the reference person to orally read out words in the text (8) and a reference time (28) taken by the reference person to orally read out each of the word in the text (8),
to compare the target words per minute count (14) and the reference words per minute (41) for determining a normalizing factor,
to normalize the target time (27) with the normalization factor to generate a normalized target time (29) for each word,
to process the normalized target time (29) and the reference time (28) for each of the corresponding information and to deduce a prolonging ratio and to compare the prolonging ratio and a prolonging threshold, and if the prolonging ratio is more than the prolonging threshold, to determine such words, and optionally their position as prolonging information (19), the processing unit (7) is optionally adapted to further determine at least one of a prolonging intensity related to intensity of prolonged word, a prolonging pitch related to pitch of prolonged word, a start time of prolonged word in the target audio, or an end time of the prolonged word in the target audio, or combination thereof as the prolonging information (19).

8. The system according to the claim 1, wherein the processing unit (7) is adapted to process the target transcription (6) by comparing with a dictionary of words (30) and based on such comparison, adapted to generate a confidence score (31) for each of the words in the target transcription (6) and to further compare the confidence score (31) with an interjection threshold (32), and if the confidence score (31) of the word is less than the interjection threshold (32) then determining such word as interjection information (20).

9. The system (1) according to the claim 1, wherein the processing unit (7) is adapted to process the target transcription (6) by comparing with the dictionary of words (30) and based on such comparison, add a new word that was not found in the dictionary (30) to a custom dictionary (42).

10. The system (1) according to the claim 1, wherein the processing unit (7) is adapted to process the target transcription (6) by comparing adjacent words, and if the adjacent words are identified to be repetition then those words are adapted to be determined as repetition information (21) optionally along with positions of such words, the processing unit (7) is optionally adapted to process the target transcription (6) and the target audio (4) to further determine at least one of a repetition intensity related to intensity of repeated words, a repetition pitch related to pitch of repeated words, a start time of repeated words in the target audio, or an end time of the repeated words in the target audio, or combination thereof as the repetition information (21), wherein the processing unit (7) is optionally adapted to process the repetition information (21) and the target transcription (6), and to generate a repetition fluency report (35) with words determined to be the repetitions onto the target transcription (6).

11. The system (1) according to the claim 1, wherein the processing unit (7) is adapted to process the target transcription (6) and the target audio (4) and to determine duration between each pair of words in the target transcription as pause information (24).

12. The system (1) according to the claim 1, wherein the processing unit (7) is adapted to process the target transcription (6) and the target audio (4), and to identify phonemes in each word of the target transcription as phoneme information (25), the processing unit (7) is optionally adapted to determine at least one of a phoneme intensity related to intensity of each phoneme, a phoneme pitch related to pitch of repeated phoneme, a start time of each phoneme in the target audio, or an end time of each phoneme in the target audio, or combination thereof as the phoneme information (25).

13. The system (1) according to the claim 1, wherein the processing unit (7) is adapted to receive and process at least one of the insertion information (16), the deletion information (17), the substitution information (18), or combination thereof along with the target transcription (6) and the text (8), and to generate a fluency report (33) showing various words omitted, substituted, or added, or combination thereof by the user while reading the text (8), wherein the words omitted, substituted, and added are annotated differently.

14. The system (1) according to the claim 1, wherein the processing unit (7) is adapted to receive and process the interjection information (20) and the target transcription (6), and to generate an interjection fluency report with words determined to be the interjection onto the target transcription (6).

15. A method for analyzing an audio to measure oral reading fluency or progress in oral reading fluency in a text illustrated through the audio, the method comprising:
receive a target audio from a user using an input unit, wherein the target audio relates to oral reading of the text by the user;
further sending the target audio to the transcribing unit, and processing the target audio by the transcribing unit to generate a target transcription of the target audio;
receiving and processing at least one of the target transcription, the text, the target audio, or a reference audio, or combination thereof by a processing unit, wherein the reference audio relates to an oral reading of the text by a reference person;
based on such processing, generating a primary metrics by the processing unit, wherein the primary metrics comprising:
a count of total number of words in the text,
a count of number of words in the target transcription,
a count of correct number of words correctly read by the user from the text,
a words per minute count relating to number of words orally read out by the user every minute,
a correct word per minute count relating number of correct words orally read out by the user every minute,
an insertion information related to additional words added by the user to the text in the target transcription,
a deletion information related to words omitted by the user to the text in the target transcription,
a substitution information related to words replaced by different words to the text in the target transcription,
a prolonging information relates to additional time taken by the user to read a word in comparison to the time taken to read the same word by the reference person,
an interjection information relates to words in the target transcription which are not part of a dictionary, a repetition information relates to words which are same and are placed adjacent to each other in target transcription, an intensity information relates to intensity of at least each of the words or phonemes in the target audio, or combination thereof, a pitch information relates to pitch of at least each of the words or phonemes in the target audio, or combination thereof, a pause information relates to pauses taken by the user in the target audio, a phoneme information relates to phonemes in the target audio, or combination thereof, receiving and processing the prolonging information;

generating a prolonging graph showing words which were prolonged and a time taken by the user to read to prolonged word with respect to a time taken by the reference person to read the word;

receiving and processing the intensity information;

generating a target intensity graph related to intensity of each word and/or phoneme read by the user;

dividing the target intensity graph and a reference intensity graph into multiple frames on a time scale, wherein the reference intensity graph relates to intensity of each word and/or phoneme read by the reference person;

categorizing each of the frames to either have local maxima (rising) or local minima (falling) with respect to a previous frame in each of the intensity graphs;

comparing each of the categorized frames in the target intensity graph with corresponding categorized frames in the reference intensity graph;

determining a intensity proximity score of the intensities of each of the corresponding words read by the user and the reference person;

receiving and processing the pitch information;

generating a target pitch graph related to pitch of each word ready by the user;

diving the target pitch graph and a reference pitch graph into multiple frames on a time scale, wherein the reference pitch graph relates to pitch of each word read by the reference person;

categorizing each of the time frames to either have local maxima (rising) or local minimal (falling) with respect to a previous frame in each the target pitch graph and reference pitch graph;

comparing each of the categorized frames in the target pitch graph with corresponding categorized frames in the reference pitch graph;

determining a pitch proximity score of the pitches of each of the corresponding words read by the user and the reference person; and directly rendering the prolonging graph, the target intensity graph, the reference intensity graph, the target pitch graph, and the reference pitch graph on a display unit as the user is reading.

16. A computer program product stored on a non-transitionary computer readable medium and adapted to be executed on one or more processors, wherein the non-transitory computer readable medium and the one or more processors are adapted to be coupled to a communication network interface, the computer program product on execution to enable the one or more processors to perform following steps comprising:

receiving a target audio from a user via an input unit, wherein the target audio relates to oral reading of the text by the user;

processing the target audio and generating a target transcription of the target audio;

receiving and processing at least one of the target transcription, a text, the target audio, or a reference audio, or combination thereof, wherein the reference audio relates to an oral reading of the text by a reference person, and based on the processing, to generate a primary metrics comprising:

a count of total number of words in the text, a count of number of words in the target transcription, a count of correct number of words correctly read by the user from the text, a words per minute count relating to number of words orally read out by the user every minute, a correct word per minute count relating number of correct words orally read out by the user every minute, an insertion information related to additional words added by the user to the text in the target transcription, a deletion information related to words omitted by the user to the text in the target transcription, a substitution information related to words replaced by different words to the text in the target transcription, a prolonging information relates to additional time taken by the user to read a word in comparison to the time taken to read the same word by the reference person, an interjection information relates to words in the target transcription which are not part of a dictionary, a repetition information relates to words which are same and are placed adjacent to each other in target transcription, an intensity information relates to intensity of at least each of the words or phonemes in the target audio, or combination thereof, a pitch information relates to pitch of at least each of the words or phonemes in the target audio, or combination thereof, a pause information relates to pauses taken by the user in the target audio, a phoneme information relates to phonemes in the target audio, or combination thereof, receiving and processing the prolonging information, generating a prolonging graph showing words which were prolonged and a time taken by the user to read to prolonged word with respect to a time taken by the reference person to read the word, receiving and processing the intensity information, generating a target intensity graph related to intensity of each word and/or phoneme read by the user, dividing the target intensity graph and a reference intensity graph into multiple frames on a time scale, wherein the reference intensity graph relates to intensity of each word and/or phoneme read by the reference person, categorizing each of the frames to either have local maxima (rising) or local minima (falling) with respect to a previous frame in each of the intensity graphs, comparing each of the categorized frames in the target intensity graph with corresponding categorized frames in the reference intensity graph, determining a intensity proximity score of the intensities of each of the corresponding words read by the user and the reference person,
receiving and processing the pitch information,
generating a target pitch graph related to pitch of each word ready by the user,
diving the target pitch graph and a reference pitch graph into multiple frames on a time scale, wherein the reference pitch graph relates to pitch of each word read by the reference person,
categorizing each of the time frames to either have local maxima (rising) or local minimal (falling) with respect to a previous frame in each the target pitch graph and reference pitch graph,
comparing each of the categorized frames in the target pitch graph with corresponding categorized frames in the reference pitch graph,
determining a pitch proximity score of the pitches of each of the corresponding words read by the user and the reference person,
directly rendering the prolonging graph, the target intensity graph, the reference intensity graph, the target pitch graph, and the reference pitch graph on a display unit as the user is reading.

* * * * *